June 2, 1931. C. G. MAHANA 1,808,240
POWER TRANSMISSION MEANS
Filed Sept. 14, 1925 2 Sheets-Sheet 1

INVENTOR
CHARLES G. MAHANA,
by Roy M. Eilers, ATTORNEY.

June 2, 1931.  C. G. MAHANA  1,808,240
POWER TRANSMISSION MEANS
Filed Sept. 14, 1925   2 Sheets-Sheet 2

INVENTOR
CHARLES G. MAHANA
BY Roy M. Eilers
ATTORNEY

Patented June 2, 1931

1,808,240

UNITED STATES PATENT OFFICE

CHARLES G. MAHANA, OF THREE RIVERS, MICHIGAN, ASSIGNOR TO FAIRBANKS, MORSE & CO., OF CHICAGO, ILLINOIS, A CORPORATION OF ILLINOIS

POWER TRANSMISSION MEANS

Application filed September 14, 1925. Serial No. 56,265.

My invention relates to improvements in power transmission means, and more particularly to such means as adapted to railway motor cars in which a friction clutch may be used between the driving means and the driven means for the purpose of disconnecting the prime-mover from the load while the prime-mover continues to run.

The object of my invention is to provide a clutch of the class described which is economical to construct, simple and easy to assemble and which has a minimum of working parts.

Another object of my invention is to provide for a railway motor car, a clutch having means thereon for dissipating the heat generated while the clutch is slipping, so that the clutch may be slipped for long continued periods of time without any injurious effects to the device itself or to any part of the apparatus to which it may be connected. With my car it is possible to start up under a full-load when the prime-mover is turning over at a speed sufficiently high to develop maximum torque, or the load may be changed as suddenly as desired without stalling the prime-mover, or in any way affecting its efficient operation.

Further objects and advantages of my invention will appear from the following drawings and description thereof.

Although my invention consists largely in the construction and arrangement of parts hereinafter described and particularly pointed out in the claims, yet I do not limit my invention to the precise form, construction or arrangement of parts shown or the several parts thereof, inasmuch as various alterations may be made without changing the scope of my invention.

Figure 1:
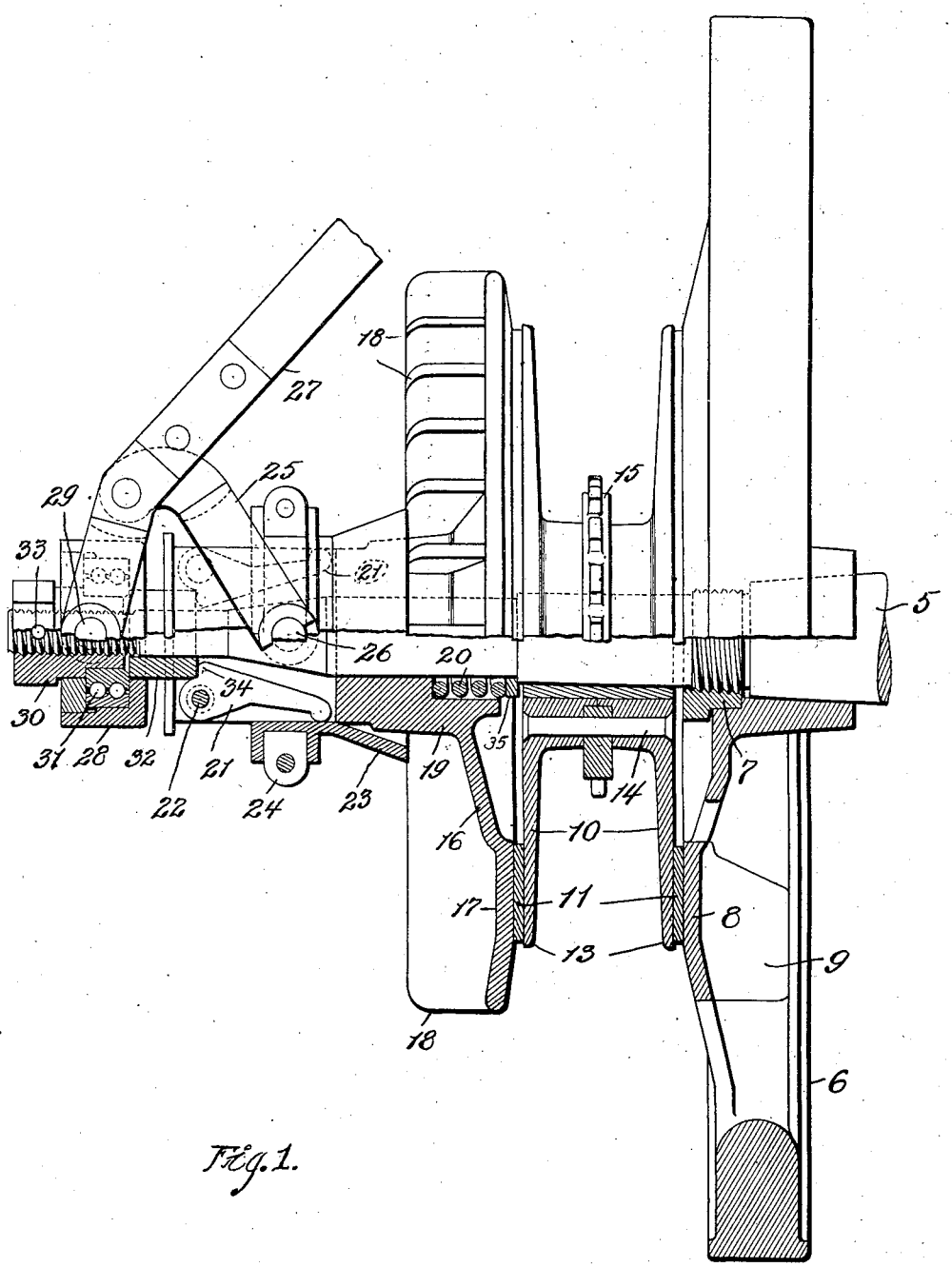
Figure 2:
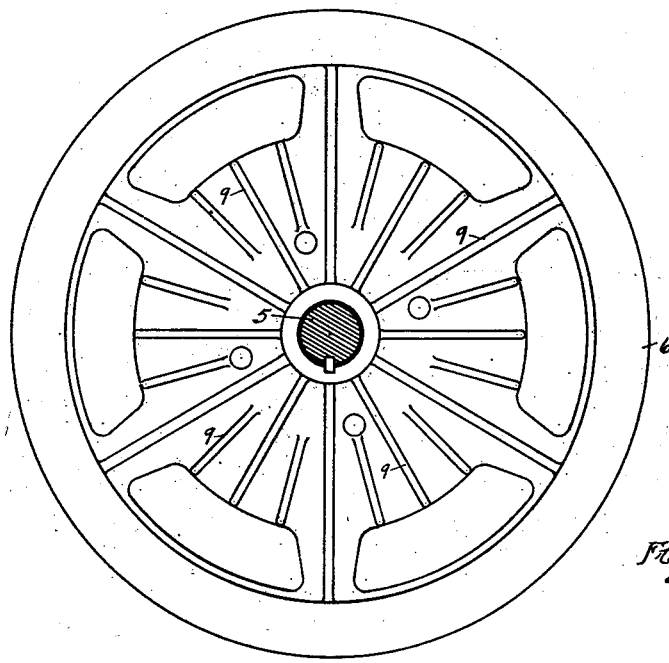
Figure 3:
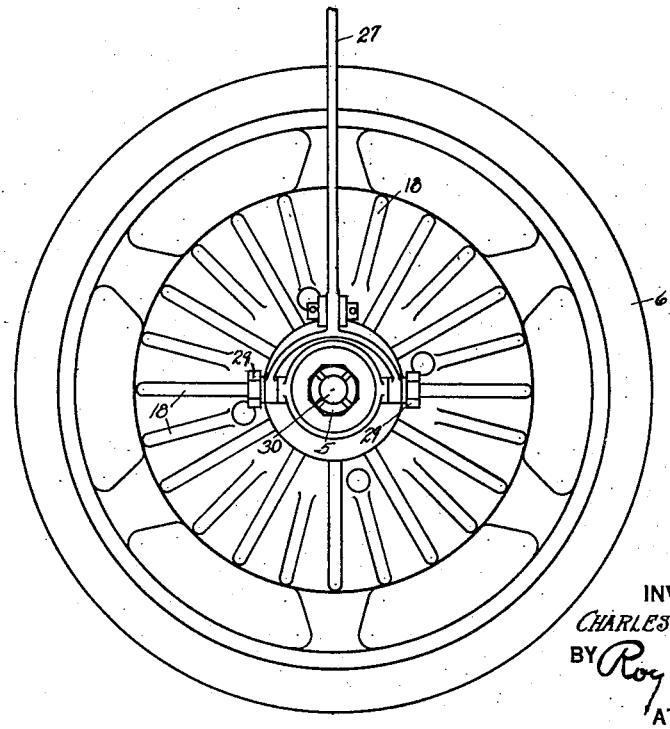

Fig. 1 is a detailed view, partially in section, of a preferred form of my clutch, Fig. 2 is an end view of Fig. 1 looking toward the operating end; and Fig. 3 is an end view of Fig. 1 looking toward the flywheel.

I show a preferred form of my power transmission device as applied to a driving shaft 5. A fly-wheel 6 may be employed, in cases where a fly-wheel is desirable, and may be attached to shaft 5 in any suitable manner, such as by nut 7. I prefer to form the fly-wheel 6 with a friction-face or surface 8, so that the fly-wheel may act as a driving member in my device. Heat dissipating fins or projections 9 are preferably provided. I prefer to put these projections behind the surface 8 and preferably to form them so as to conduct the heat generated in that surface outwardly and away from the hub of the fly-wheel.

A preferred form of driven member, preferably of metal, is shown at 10, loosely mounted on the shaft. This member preferably has plates 13, carrying friction facings 11. These facings 11 may be of any suitable material and may be attached in any suitable manner to the driven member 10. I prefer to make them of heat insulating material, for example, asbestos or compounds of the same. The driven member 10 is preferably made in two parts held together by any suitable means, such as by rivets 14, thus providing an air space for cooling between the plates 13. The rivets 14 also serve to hold in place any suitable power transmitting means, such as sprocket 15. By this construction I have provided a simple and efficient means for transmitting power directly from the driven member itself. While I show the driven member as being made in two parts, with the sprocket 15 carried between them, and constituting a functionally integral structure, I may form my driven member and power transmitting means in one piece.

A preferred form of driving member 16 is preferably mounted on shaft 5 so as to turn with it, but be capable of movement along the shaft so as to provide for the engaging or disengaging of the clutch. Driving member 16 preferably has a friction surface 17 adapted to engage with a facing 11 on member 10 and is preferably provided with heat-dissipating fins or projections 18, so formed as to conduct the heat generated in the surface 17 away from that surface and outwardly from the hub 19 of the member 16. It will be evident that these fins 18, as well as the fins 9 on the fly-wheel 6, rotating with shaft 5 as they do, not only tend to conduct the heat away from the friction surfaces, but also act as fan blades to circulate the air about these surfaces and thereby tend to cool them. The member 16 is preferably provided with a hub 19, having a recess therein adapted to contain a clutch spring 20 which preferably presses against a collar 35 on shaft 5 to separate the driving and driven members.

I prefer to form my driving and driven members so that one member carries the heat-dissipating fins while the other carries the heat-insulating facing. With such a construction, the maximum heat flow is into that member carrying the fins, and the member carrying the insulating facing remains comparatively unaffected, and is not subjected to dangerous temperatures. It is immaterial, from the stand-point of efficient heat-dissipation, which member carries the fins and which carries the heat-insulating facing.

The hub 19 of driving member 16 is preferably slotted to contain locking fingers 21 which may swing about pivots 22 fastened to the hub. These fingers 21 preferably have shoulders 34 which are adapted to contact with a collar 32 on the shaft 5, when the fingers are moved inwardly about the pivots 22 towards the axis of the shaft through the action of a flared member 23. Member 23 is preferably slidably keyed to the hub of member 16. In the position shown in the figure, the member 23 has been moved to the right along hub 19, so that the fingers 21 have been moved inwardly by the restricted portion of member 23. The shoulders 34 have contacted with collar 32 thereby moving the driving member 16 against the action of spring 20 into engaged position with driven member 10, which, in turn, is also moved slightly to the right to engage with the combined fly-wheel and driving member 6. In this position the clutch is engaged and locked. To disengage the clutch, the member 23 is moved to the left (in the figure) thus permitting the fingers 21 to move outwardly along the flared inner surface of member 23 under the action of clutch spring 20 which will thus separate the driving and driven members and disengage the clutch. It will be seen that member 23, and fingers 21, rotate together with the hub 19 and no wear can, therefore, occur between these members.

As a means for moving member 23 along the hub 19 to engage or disengage the clutch, I prefer to employ a non-rotating shoe or ring 24, having a fork or yoke 25 pivoted thereto at 26. This yoke is preferably operated by means of a lever 27. This operating lever 27 is preferably carried by means of a non-rotating fulcrum member 28 by fulcrum pins 29. Member 28 is preferably carried by adjusting nut 30 on shaft 5 through any suitable form of bearing 31. A pin 33 serves to lock nut 30 in position. Nut 30 also serves to adjust the position of collar 32 on shaft 5 with respect to shoulders 34 on fingers 21, and consequently, forms a very convenient means for adjusting the action of the clutch to compensate for wear of the facings and the like. By my means of mounting the yoke 25 and lever 27 directly on the clutch itself, through ring 24 and bearing 31, I have provided a unitary structure free of all external supports and by removing pin 33 and nut 30, the whole clutch structure may be removed from the shaft 5, thereby making for great ease of assembly and repair.

While I show a combined fly-wheel and driving member 6, I may omit the fly-wheel and employ a driving member similar to member 16, or I may omit entirely the driving member on that side of the driven member 10 and secure my clutch action through member 10 and driving member 16 only.

I claim:

1. In a power transmitting mechanism in combination, an engine shaft, a fly wheel mounted thereon, having a plane frictional driving surface on one side thereof and radiating cooling fins on its opposite side, a driven member rotatably mounted on said shaft and having power transmitting means rigidly connected therewith and having plane frictional driving surfaces at each end thereof, a driving member slidably mounted on said shaft and having a plane frictional surface on one side thereof to engage said driven member and having radiating cooling fins on its opposite side, said slidable driving member having a hub provided with a socket on its side adjacent said driven member, a spring in said socket and a collar on said shaft said spring engaging said collar and tending to separate said slidable member from said driven member, mechanism mounted entirely on said shaft for moving said slidable driving member to clamp said driven member between it and said fly wheel.

2. In a power transmitting device, in combination, an engine shaft, a fly wheel mounted fast on said shaft, a slidable clutch member mounted on said shaft and rotatable therewith said fly wheel and clutch member having thin radial web portions constituting plane frictional driving surfaces on their confronting faces and radiating cooling fins on their back faces, a driven member comprising a hub portion carrying a power transmitting means and having two radial flanges provided with friction facings for engagement with the friction surfaces of said fly wheel and clutch member, a spring located in the hub of said clutch member and reacting against said shaft to separate said clutch member from said fly wheel, clutch operating means carried entirely by said shaft for engaging said friction surfaces and means mounted on the free end of said shaft for adjusting said clutch operating means.

3. In a power transmitting device, an engine shaft having a fly wheel mounted fast thereon and having its free end extended beyond said fly wheel, a slidable clutch member mounted on the free end of said shaft and rotatable therewith, said fly wheel and clutch member having web portions provided with friction surfaces, a driven member rotatably mounted on said shaft between said fly wheel and said clutch member, said driven member having a hub portion carrying a power transmitting member, and having two end flanges provided with plane friction facings for engagement with corresponding friction surfaces on said web portions of said fly wheel and said clutch member, the outer faces of said fly wheel and clutch member provided with radial cooling fins, spring means mounted on said shaft for separating said clutch member from said driven member, means carried by the free end of said shaft for moving said clutch member into clutching position and means at the end and carried by said shaft for adjusting the clutch.

CHARLES G. MAHANA.